United States Patent
Papaiacovou et al.

(10) Patent No.: US 8,263,682 B1
(45) Date of Patent: Sep. 11, 2012

(54) SOLVENT-BASED DYE SUBLIMATION INK COMPOSITION

(75) Inventors: Iacovos Papaiacovou, Huntington, NY (US); Zorka Gallino, Middle Island, NY (US); Donald H. Balbinder, Nissequogue, NY (US); Daniel Slep, Setauket, NY (US)

(73) Assignee: Hilord Chemical Corporation, Hauppauge, NY (US)

( * ) Notice: Subject to any disclaimer, the term of this patent is extended or adjusted under 35 U.S.C. 154(b) by 547 days.

(21) Appl. No.: 11/605,629

(22) Filed: Nov. 29, 2006

Related U.S. Application Data

(60) Provisional application No. 60/740,405, filed on Nov. 29, 2005.

(51) Int. Cl.
  *C09D 11/00* (2006.01)
(52) U.S. Cl. ......... 523/160; 523/161; 428/212; 428/216
(58) Field of Classification Search .................. 523/160, 523/161
  See application file for complete search history.

(56) References Cited

U.S. PATENT DOCUMENTS

| | | | | |
|---|---|---|---|---|
| 4,063,878 | A * | 12/1977 | Weeks | 8/471 |
| 4,880,768 | A * | 11/1989 | Mochizuki et al. | 503/227 |
| 5,549,741 | A * | 8/1996 | Pennaz et al. | 524/77 |
| 5,574,078 | A * | 11/1996 | Elwakil | 523/161 |
| 5,744,519 | A * | 4/1998 | Heraud et al. | 523/160 |
| 6,105,502 | A * | 8/2000 | Wagner et al. | 101/491 |
| 2002/0012038 | A1 * | 1/2002 | Xu et al. | 347/213 |
| 2004/0266912 | A1 * | 12/2004 | Aida et al. | 523/160 |

FOREIGN PATENT DOCUMENTS

| | | | |
|---|---|---|---|
| EP | 1 783 179 | * | 5/2007 |
| WO | WO 2004/013237 | * | 2/2004 |
| WO | WO 2004/094149 | * | 11/2004 |
| WO | WO 2006/018922 | * | 2/2006 |

* cited by examiner

*Primary Examiner* — Doris Lee
(74) *Attorney, Agent, or Firm* — Gerald T. Bodner

(57) ABSTRACT

A solvent-based dye sublimation ink composition includes specific chemical formulations of production agents for its manufacture in several colors. The sublimation ink composition includes a vinyl chloride-vinyl acetate copolymer, a polymeric amide, 2-methoxy-1-methylethyl acetate, N-butyl acetate, butan-2-OL, petroleum distillate, disperse and/or solvent dyes, propylene glycol and one or more acetates. Once produced, the solvent-based dye sublimation ink of the present invention may be used with ink jet printers and prevents or minimizes paper cockling while exhibiting outstanding stability and high print density capabilities.

31 Claims, No Drawings

SOLVENT-BASED DYE SUBLIMATION INK COMPOSITION

CROSS REFERENCE TO RELATED APPLICATION

This application is related to U.S. Provisional Application Ser. No. 60/740,405 filed on Nov. 29, 2005, and entitled "Solvent-based Dye Sublimation Ink Composition", the disclosure of which is incorporated herein by reference and on which priority is hereby claimed.

BACKGROUND OF THE INVENTION

1. Field of the Invention

The present invention generally relates to printing inks, and more particularly relates to heat activated or dye sublimation inks used with ink jet printers.

2. Description of the Prior Art

Dye sublimation inks are commonly used with ink jet printers to produce color images directly on a substrate or on a transfer medium from which the image is transferred to the substrate. In particular, there are two basic types of dye sublimation inks used for ink jet printing: water-based inks and oil-based inks. Furthermore, there are particular advantages and disadvantages to each of these types of inks.

Water-based dye sublimation inks provide excellent print density and are compatible with many printers. Printers using such water-based inks do not require venting, and there is very little odor given off, and any environmental hazards associated with the use of water-based inks are minimal. However, one of the primary disadvantages of using water-based inks is that it causes paper cockling when printing thereon, as the water is absorbed by the paper medium. Another disadvantage of water-based inks is that they will not work on grand format solvent printers.

Oil-based dye sublimation ink compositions were created to solve the problem of paper cockling prevalent with the use of water-based inks. An oil-based dye sublimation ink, or more generally, a hydro-carbon based ink, has the advantage over water-based dye sublimation inks of not cockling the paper medium on which it is printed. Furthermore, oil-based dye sublimation inks are compatible with most grand format printers, with some minor modifications to the printer components. One disadvantage, however, with such oil-based inks is that they exhibit a low print density.

There are used in the printing industry solvent-based pigment inks, which have characteristics that are substantially as good as those of water-based ink compositions and are well suited for use various mediums, as cockling of the paper is avoided. However, there are no solvent-based dye sublimation inks known by the inventors herein to be currently used in the printing industry. The reason for the believed non-existence of solvent-based dye sublimation inks is the difficulty of manufacturing such a dye sublimation ink composition that is suitable for use in the printing industry. The dye tends to only partially dissolve in the solvent, which lowers the density and "stability" of the composition. The term "stability" herein means maintaining the dye particles in solution and further maintaining the solution's physical characteristics, such as surface tension and viscosity, fairly constant.

OBJECTS AND SUMMARY OF THE INVENTION

It is an object of the present invention to provide a solvent-based dye sublimation ink for use with ink jet printers.

It is another object of the present invention to provide a solvent-based dye sublimation ink that minimizes or prevents paper cockling.

It is a further object of the present invention to provide a solvent-based dye sublimation ink that exhibits outstanding stability and high print density capabilities.

A solvent-based sublimation ink composition formed in accordance with one form of the present invention utilizes specific formulations of production agents for its manufacture in several colors, including the following colors: black, light black, cyan, light cyan, magenta, light magenta and yellow and light yellow. Preferably, the ink composition includes the following components: at least one vinyl chloride-vinyl acetate copolymer in the range of about 2% to about 6%; at least one polymeric amide in the range of about 0% to about 4%; at least one ethyl acetate in the range of about 0% to about 4%; 2-methoxy-1-methylethyl acetate in the range of about 0% to about 1.25%; N-butyl acetate in the range of about 0% to about 2.5%; butan-2-OL in the range of about 0% to about 0.5%; at least one distillate, such as a petroleum distillate (e.g. paraffin), in the range of about 0% to about 3%; at least one of a disperse dye and a solvent dye, which may include fluorescent dyes, depending on the particular color, in the range of about 0.25% to about 9%; propylene glycol in the range of about 0% to about 2%; and one or more acetates, or combinations thereof, such as 2-butoxyethyl acetate or 2-methylpropyl acetate, in the range of about 78% to about 95%.

The dyes, part of the additives, part of the resins and part of the solvents are processed for about 20 to about 60 hours. The remaining of the additives, solvents and resins are added at the end of the processing cycle. To maintain color consistency, the pigment amount is kept constant according to the applications' requirement. The required physical properties of the ink composition of the present invention are achieved by combining the concentrate, which contains the required amount of dye, with a resin-solvent mixture.

In accordance with another method of manufacturing the solvent-based dye sublimation ink of the present invention, the dye is treated more as a pigment, and is used with a copolymer binder and wetting agents, and the dye is ground for at least four hours in a process mill, such as a ball mill, attritor or horizontal mill. The solvent used in the dye sublimation ink of the present invention is preferably either an ether or acetate.

The solvent dye sublimation inks may be printed onto an intermediary substrate, such as paper, and then transferred onto the final substrate. The solvent dye sublimation inks may also be printed directly onto the final substrate, such as polyester or any other treated textile, and then the dyes may be activated through a sublimation process, which is well known in the art.

These and other objects, features and advantages of the present invention will be apparent from the following detailed description of illustrative embodiments thereof.

DETAILED DESCRIPTION OF THE PREFERRED EMBODIMENTS

The inventors herein have discovered a solvent-based dye sublimation ink composition which exhibits outstanding stability and high print density capabilities, with no paper cockling. The formulation for the ink composition of the present invention preferably comprises, consists of or consists essentially of the following components in the following percent ranges:

Solvent Dye Sublimation Ink

First Preferred Form

The solvent-based dye sublimation ink composition in accordance with a first preferred form of the present invention comprises, consists of or consists essentially of the following components in the following percent ranges:

1. at least one vinyl chloride-vinyl acetate copolymer, preferably in the range of about 2% to about 6%;
2. at least one of an ether and at least one acetate, preferably in the range of about 78% to about 95%; and
3. at least one of a disperse dye and a solvent dye, preferably in the range of about 0.25% to about 9%.

Preferably, the at least one acetate includes at least one of 2-butoxyethyl acetate, 2-methylpropyl acetate, ethyl acetate and N-butyl acetate.

Solvent Dye Sublimation Ink

Second Preferred Form

The solvent-based dye sublimation ink composition in accordance with a second preferred form of the present invention comprises, consists of or consists essentially of the following components in the following percent ranges:

1. at least one vinyl chloride-vinyl acetate copolymer, preferably in the range of about 2% to about 6%;
2. at least one of an ether and at least one acetate, preferably in the range of about 78% to about 95%;
3. at least one of a disperse dye and a solvent dye, preferably in the range of about 0.25% to about 9%; and
4. at least one polyamide, preferably in the range of about 0% to about 4% and more preferably in the range of about 0.1% to about 4%.

Preferably, the at least one acetate includes at least one of 2-butoxyethyl acetate, 2-methylpropyl acetate, ethyl acetate and N-butyl acetate.

Solvent Dye Sublimation Ink

Third Preferred Form

The solvent-based dye sublimation ink composition in accordance with a third preferred form of the present invention comprises, consists of or consists essentially of the following components in the following percent ranges:

1. at least one vinyl chloride-vinyl acetate copolymer, preferably in the range of about 2% to about 6%;
2. at least one of an ether and at least one acetate, preferably in the range of about 78% to about 95%;
3. at least one of a disperse dye and a solvent dye, preferably in the range of about 0.25% to about 9%; and
4. Butan-2-OL, preferably in the range of about 0% to about 0.5% and more preferably in the range of about 0.1% to about 0.5%.

Preferably, the at least one acetate includes at least one of 2-butoxyethyl acetate, 2-methylpropyl acetate, ethyl acetate and N-butyl acetate.

Solvent Dye Sublimation Ink

Fourth Preferred Form

The solvent-based dye sublimation ink composition in accordance with a fourth preferred form of the present invention comprises, consists of or consists essentially of the following components in the following percent ranges:

1. at least one vinyl chloride-vinyl acetate copolymer, preferably in the range of about 2% to about 6%;
2. at least one of an ether and at least one acetate, preferably in the range of about 78% to about 95%;
3. at least one of a disperse dye and a solvent dye, preferably in the range of about 0.25% to about 9%; and
4. at least one distillate, preferably in the range of about 0% to about 3% and more preferably in the range of about 0.1% to about 3%.

Preferably, the at least one distillate is a petroleum distillate, such as paraffin.

Preferably, the at least one acetate includes at least one of 2-butoxyethyl acetate, 2-methylpropyl acetate, ethyl acetate and N-butyl acetate.

Solvent Dye Sublimation Ink

Fifth Preferred Form

The solvent-based dye sublimation ink composition in accordance with a fifth preferred form of the present invention comprises, consists of or consists essentially of the following components in the following percent ranges:

1. at least one vinyl chloride-vinyl acetate copolymer, preferably in the range of about 2% to about 6%;
2. at least one of an ether and at least one acetate, preferably in the range of about 78% to about 95%;
3. at least one of a disperse dye and a solvent dye, preferably in the range of about 0.25% to about 9%; and
4. propylene glycol, preferably in the range of about 0% to about 2% and more preferably in the range of about 0.1% to about 2%.

Preferably, the at least one acetate includes at least one of 2-butoxyethyl acetate, 2-methylpropyl acetate, ethyl acetate and N-butyl acetate.

Solvent Dye Sublimation Ink

Sixth Preferred Form

The solvent-based dye sublimation ink composition in accordance with a sixth preferred form of the present invention comprises, consists of or consists essentially of the following components in the following percent ranges:

1. vinyl chloride-vinyl acetate copolymer in the range of about 2% to about 6%;
2. polymeric amide in the range of about 0% to about 4%, and more preferably in the range of about 0.1% to about 4%;
3. ethyl acetate in the range of about 0% to about 4%, and more preferably in the range of about 0.1% to about 4%;
4. 2-methoxy-1-methylethyl acetate in the range of about 0% to about 1.25%, and more preferably in the range of about 0.1% to about 1.25%;
5. N-butyl acetate in the range of about 0% to about 2.5%, and more preferably in the range of about 0.1% to about 2.5%;
6. butan-2-OL in the range of about 0% to about 0.5%, and more preferably in the range of about 0.1% to about 0.5%;
7. distillates (petroleum), such as paraffin, in the range of about 0% to about 3%, and more preferably in the range of about 0.1% to about 3%;
8. disperse and/or solvent dyes (including Fluorescent) in the range of about 0.25% to about 9%;
9. propylene glycol in the range of about 0% to about 2%, and more preferably in the range of about 0.1% to about 2%; and
10. About 78% to about 95% of any Acetate or combinations thereof, such as:
  2-butoxyethyl acetate, and/or
  2-methylpropyl acetate.

An example of a solvent-based dye sublimation ink composition formed in accordance with the present invention and specifically formulated for use with an Epson printer head Model No. 10000 is set forth below in Example 1:

EXAMPLE 1

Ink Formulation for Epson printer head Model No. 10000
Formula in % by mass

| CHEMICAL NAME | BLACK | CYAN | LIGHT CYAN | MAGENTA | LIGHT MAGENTA | YELLOW |
|---|---|---|---|---|---|---|
| VINYL CHLORIDE-VINYL ACETATE COPOLYMER | 0.96 | 1.19 | 0.46 | 0.768 | 0.28 | 0.6086 |
| SOLSPERSE-34750 (wetting agent) | 5.3 | | | | | |
| N-BUTYL ACETATE (wetting agent) | 2.9 | | | 9.2 | 28.04 | 7.92 |
| POLYMERIC AMIDE | | 2.975 | 1.15 | 1.035 | 0.375 | 1.75 |
| ETHYL ACETATE | | 2.975 | 1.15 | 1.035 | 0.375 | 1.75 |
| CARBOWAX-PEG-200 | | | | 0.634 | | |
| MONOAZO AND ANTHRAQUINONE DYESTUFFS | 5.0 | | | | | |
| SOLVENT VIOLET-13 | 1 | 0.58 | 0.22 | | | |
| DISPERSE YELLOW-54 | 0.5 | | | | | 2.22 |
| DISPERSE BLUE-359 | | 2.35 | 0.93 | | | |
| DISPERSE RED-60 | | | | 1.6 | 0.58 | |
| DISPERSE VIOLET-17 | | | | 1.6 | 0.58 | |
| ACRYLIC POLYMER | | | 3.46 | | | 1.34 |
| ISOBUTYL ACETATE | | 2.65 | 1 | | | |
| EB-ACETATE | 84.34 | 87.28 | 91.63 | 84.128 | 69.77 | 84.4144 |

The term "Solsperse" is a registered trademark for a chemical dispersing agent manufactured by the Lubrizol Corporation of Wickliffe, Ohio. The term "Carbowax" is a registered trademark for a chemical binding agent manufactured by Union Carbide Chemicals and Plastics Technology Corporation of Danbury, Conn. The various dyes listed (e.g., solvent violet-13, disperse yellow-54, disperse blue 359, disperse red-60 and disperse violet-17) are well known to those skilled in the art.

The various formulations presented in the above table are for various printing colors, including black, cyan, light cyan, magenta, light magenta and yellow. These are colors which are commonly used in the printing industry.

A solvent-based dye sublimation ink composition formed in accordance with the present invention for use with a Hitachi solvent printer head used in the PX series of printers for the colors black, light black, cyan, light cyan, magenta, light magenta, yellow, and light yellow, is set forth below in Example 2:

EXAMPLE 2

Ink Formulation for Hitachi Solvent Printer Head Used in PX Series of Printers

| CHEMICAL NAME | Black | Cyan | Magenta | Yellow | Lt. Black | Lt. Cyan | Lt. Magenta | Lt. Yellow |
|---|---|---|---|---|---|---|---|---|
| VINYL CHLORIDE-VINYL ACETATE | 2.65% | 2.65% | 2.16% | 3.34% | 3.82% | 4.11% | 4.02% | 4.57% |
| 2-METHOXY-1-METHYLETHYL ACETATE | 0.68% | 0.24% | 0.00% | 0.15% | 0.09% | 0.04% | 0.00% | 0.01% |
| N-BUTYL ACETATE | 1.25% | 0.46% | 0.00% | 0.28% | 0.16% | 0.06% | 0.00% | 0.02% |
| BUTAN-2-OL | 0.34% | 0.12% | 0.00% | 0.08% | 0.04% | 0.02% | 0.00% | 0.01% |
| POLYMERIC AMIDE | 3.16% | 1.09% | 3.14% | 0.90% | 0.35% | 0.19% | 0.29% | 0.03% |
| ETHYL ACETATE | 3.16% | 1.09% | 3.14% | 0.90% | 0.35% | 0.19% | 0.29% | 0.03% |
| PROPYLENE GLYCOL | 0.25% | 0.50% | 0.50% | 0.50% | 1.50% | 1.50% | 1.50% | 1.50% |
| 2-BUTOXYETHYL ACETATE | 78.39% | 89.90% | 86.54% | 90.60% | 91.11% | 92.65% | 92.62% | 93.01% |
| 2-METHYLPROPYL ACETATE | 1.25% | 0.95% | 0.00% | 1.20% | 0.32% | 0.24% | 0.00% | 0.30% |
| SUBLAPRINT (Solvent) BLACK 70073 | 1.69% | 0.00% | 0.00% | 0.00% | 0.44% | 0.00% | 0.00% | 0.00% |
| SOLVENT VIOLET 13 | 1.44% | 1.20% | 0.00% | 0.00% | 0.36% | 0.20% | 0.00% | 0.00% |
| DISPERSE YELLOW 54 | 0.66% | 0.00% | 0.00% | 2.05% | 0.16% | 0.00% | 0.00% | 0.52% |
| DISPERSE BLACK 70065 | 5.08% | 0.00% | 0.00% | 0.00% | 1.30% | 0.00% | 0.00% | 0.00% |
| DISPERSE BLUE 359 | 0.00% | 1.80% | 0.00% | 0.00% | 0.00% | 0.80% | 0.00% | 0.00% |
| DISPERSE VIOLET 17 | 0.00% | 0.00% | 2.26% | 0.00% | 0.00% | 0.00% | 0.64% | 0.00% |
| DISPERSE RED 60 | 0.00% | 0.00% | 2.26% | 0.00% | 0.00% | 0.00% | 0.64% | 0.00% |
| TOTAL | 100.00% | 100.00% | 100.00% | 100.00% | 100.00% | 100.00% | 100.00% | 100.00% |

Sublaprint is a trademark of Keystone Aniline Corporation of Chicago, Ill.

Another solvent-based dye sublimation ink composition formed in accordance with the present invention for use with a Konica printer head Model No. KM512, again for the same colors shown in Example 2 (that is, black, light black, cyan, light cyan, magenta, light magenta, yellow and light yellow), is set forth below in Example 3:

EXAMPLE 3

Ink Formulation for Konica Print Head Model No. KM 512

| CHEMICAL NAME | Black | Cyan | Magenta | Yellow | Lt. Black | Lt. Cyan | Lt. Magenta | Lt. Yellow |
|---|---|---|---|---|---|---|---|---|
| VINYL CHLORIDE-VINYL ACETATE | 2.80% | 2.82% | 2.25% | 3.51% | 3.96% | 4.42% | 4.33% | 4.72% |
| 2-METHOXY-1-METHYLETHYL ACETATE | 0.68% | 0.24% | 0.00% | 0.15% | 0.09% | 0.04% | 0.00% | 0.01% |
| N-BUTYL ACETATE | 1.25% | 0.46% | 0.00% | 0.28% | 0.16% | 0.06% | 0.00% | 0.02% |
| BUTAN-2-OL | 0.34% | 0.12% | 0.00% | 0.08% | 0.04% | 0.02% | 0.00% | 0.01% |
| POLYMERIC AMIDE | 3.16% | 1.09% | 3.14% | 0.90% | 0.35% | 0.19% | 0.29% | 0.03% |
| ETHYL ACETATE | 3.16% | 1.09% | 3.14% | 0.90% | 0.35% | 0.19% | 0.29% | 0.03% |
| PROPYLENE GLYCOL | 1.50% | 1.75% | 1.75% | 1.75% | 2.00% | 2.00% | 2.00% | 2.00% |
| 2-BUTOXYETHYL ACETATE | 78.09% | 89.25% | 85.09% | 90.24% | 90.75% | 92.03% | 91.78% | 92.63% |
| 2-METHYLPROPYL ACETATE | 0.15% | 0.18% | 0.11% | 0.14% | 0.04% | 0.05% | 0.03% | 0.04% |
| SUBLAPRINT (Solvent) BLACK 70073 | 1.69% | 0.00% | 0.00% | 0.00% | 0.44% | 0.00% | 0.00% | 0.00% |
| SOLVENT VIOLET 13 | 1.44% | 1.20% | 0.00% | 0.00% | 0.36% | 0.20% | 0.00% | 0.00% |
| DISPERSE YELLOW 54 | 0.66% | 0.00% | 0.00% | 2.05% | 0.16% | 0.00% | 0.00% | 0.52% |
| DISPERSE BLACK 70065 ' | 5.08% | 0.00% | 0.00% | 0.00% | 1.30% | 0.00% | 0.00% | 0.00% |
| DISPERSE BLUE 359 | 0.00% | 1.80% | 0.00% | 0.00% | 0.00% | 0.80% | 0.00% | 0.00% |
| DISPERSE VIOLET 17 | 0.00% | 0.00% | 2.26% | 0.00% | 0.00% | 0.00% | 0.64% | 0.00% |
| DISPERSE RED 60 | 0.00% | 0.00% | 2.26% | 0.00% | 0.00% | 0.00% | 0.64% | 0.00% |
| TOTAL | 100.00% | 100.00% | 100.00% | 100.00% | 100.00% | 100.00% | 100.00% | 100.00% |

To manufacture the solvent-based dye sublimation ink of the present invention, the dye is treated more as a pigment, and is used with a copolymer binder and wetting agents, and the dye is ground for at least four hours in a process mill, such as a ball mill, attritor or horizontal mill. The solvent used in the dye sublimation ink of the present invention is preferably either an ether or acetate. The solvent-based dye sublimation ink of the present invention is capable of providing a high print density, is stable and causes no or negligible paper cockling.

In accordance with a preferred method of manufacturing the ink composition of the present invention, the dyes, part of the additives, part of the resins and part of the solvent are processed for about 20 to about 60 hours. The remaining of the additives, solvents and resins are added at the end of the processing cycle. To maintain color consistency, the pigment amount is kept constant according to the applications' requirement. The required physical properties of the ink composition of the present invention are achieved by combining the concentrate, which contains the required amount of dye, with a resin-solvent mixture.

Although illustrative embodiments of the present invention have been described herein, it is to be understood that the invention is not limited to those precise embodiments, and that various other changes and modifications may be effected therein by one skilled in the art without departing from the scope or spirit of the invention.

What is claimed is:

1. A solvent-based dye sublimation ink composition specifically for use with ink jet printers, which comprises:
   at least one vinyl chloride-vinyl acetate copolymer;
   at least one of an ether and at least one acetate; and
   at least one sublimable disperse dye, wherein the sublimable disperse dye is insoluble in the at least one of an ether and at least one acetate, the solvent-based dye sublimation ink composition being flowable through a head of an ink jet printer.

2. A solvent-based dye sublimation ink composition as defined by claim 1, wherein the at least one vinyl chloride-vinyl acetate copolymer is in the range of about 2% to about 6%.

3. A solvent-based dye sublimation ink composition as defined by claim 1, wherein the at least one of an ether and at least one acetate is in the range of about 78% to about 95%.

4. A solvent-based dye sublimation ink composition as defined by claim 1, wherein the at least one of a disperse dye and a solvent dye is in the range of about 0.25% to about 9%.

5. A solvent-based dye sublimation ink composition as defined by claim 1, wherein the at least one acetate includes at least one of 2-butoxyethyl acetate, 2-methylpropyl acetate, ethyl acetate and N-butyl acetate.

6. A solvent-based dye sublimation ink composition as defined by claim 1, which further comprises:
   at least one polymeric amide.

7. A solvent-based dye sublimation ink composition as defined by claim 6, wherein the at least one polymeric amide is in the range of about 0% to about 4%.

8. A solvent-based dye sublimation ink composition as defined by claim 1, which further comprises:
   Butan-2-OL.

9. A solvent-based dye sublimation ink composition as defined by claim 8, wherein the Butan-2-OL is in the range of about 0% to about 0.5%.

10. A solvent-based dye sublimation ink composition as defined by claim 1, which further comprises:
    at least one distillate.

11. A solvent-based dye sublimation ink composition as defined by claim 10, wherein the at least one distillate is in the range of about 0% to about 3%.

12. A solvent-based dye sublimation ink composition as defined by claim 1, which further comprises:
    propylene glycol.

13. A solvent-based dye sublimation ink composition as defined by claim 12, wherein the propylene glycol is in the range of about 0% to about 2%.

14. A solvent-based dye sublimation ink composition specifically for use with ink jet printers, which comprises:
    at least one vinyl chloride-vinyl acetate copolymer in the range of about 2% to about 6%;
    polymeric amide in the range of about 0% to about 4%;
    ethyl acetate in the range of about 0% to about 4%;
    2-methoxy-1-methylethyl acetate in the range of about 0% to about 1.25%;
    N-butyl acetate in the range of about 0% to about 2.5%;

Butan-2-OL in the range of about 0% to about 0.5%;
distillate in the range of about 0% to about 3%;
at least one sublimable disperse dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
at least one additional acetate in the range of about 78% to about 95%.

15. A solvent-based dye sublimation ink composition as defined by claim 14, wherein the at least one distillate includes a petroleum distillate.

16. A solvent-based dye sublimation ink composition as defined by claim 14, wherein the at least one acetate includes at least one of 2-butoxyethyl acetate and 2-methylpropyl acetate.

17. A solvent-based dye sublimation ink composition as defined by claim 14, wherein the at least one polymeric amide is in the range of about 0.1% to about 4%;
wherein the at least one ethyl acetate is in the range of about 0.1% to about 4%;
wherein the butan-2-OL is in the range of about 0.1% to about 0.5%;
wherein the at least one distillate is in the range of about 0.1% to about 3%; and
wherein the propylene glycol is in the range of about 0.1% to about 2%.

18. A solvent-based dye sublimation ink composition specifically for use with ink jet printers consisting of:
at least one vinyl chloride-vinyl acetate copolymer in the range of about 2% to about 6%;
polymeric amide in the range of about 0% to about 4%;
ethyl acetate in the range of about 0% to about 4%;
2-methoxy-1-methylethyl acetate in the range of about 0% to about 1.25%;
N-butyl acetate in the range of about 0% to about 2.5%;
Butan-2-OL in the range of about 0% to about 0.5%;
distillate in the range of about 0% to about 3%;
at least one sublimable disperse dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
at least one additional acetate in the range of about 78% to about 95%.

19. A solvent-based dye sublimation ink composition as defined by claim 18, wherein the at least one distillate includes a petroleum distillate.

20. A solvent-based dye sublimation ink composition as defined by claim 18, wherein the at least one acetate includes at least one of 2-butoxyethyl acetate and 2-methylpropyl acetate.

21. A solvent-based dye sublimation ink composition as defined by claim 18, wherein the at least one polymeric amide is in the range of about 0.1% to about 4%;
wherein the at least one ethyl acetate is in the range of about 0.1% to about 4%;
wherein the butan-2-OL is in the range of about 0.1% to about 0.5%;
wherein the at least one distillate is in the range of about 0.1% to about 3%; and
wherein the propylene glycol is in the range of about 0.1% to about 2%.

22. A solvent-based dye sublimation ink composition specifically for use with ink jet printers consisting essentially of:
at least one vinyl chloride-vinyl acetate copolymer in the range of about 2% to about 6%;
polymeric amide in the range of about 0% to about 4%;
ethyl acetate in the range of about 0% to about 4%;
2-methoxy-1-methylethyl acetate in the range of about 0% to about 1.25%;
N-butyl acetate in the range of about 0% to about 2.5%;
Butan-2-OL in the range of about 0% to about 0.5%;
distillate in the range of about 0% to about 3%;
at least one sublimable disperse dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
at least one additional acetate in the range of about 78% to about 95%.

23. A solvent-based dye sublimation ink composition as defined by claim 22, wherein the at least one distillate includes a petroleum distillate.

24. A solvent-based dye sublimation ink composition as defined by claim 22, wherein the at least one acetate includes at least one of 2-butoxyethyl acetate and 2-methylpropyl acetate.

25. A solvent-based dye sublimation ink composition as defined by claim 22, wherein the at least one polymeric amide is in the range of about 0.1% to about 4%;
wherein the at least one ethyl acetate is in the range of about 0.1% to about 4%;
wherein the butan-2-OL is in the range of about 0.1% to about 0.5%;
wherein the at least one distillate is in the range of about 0.1% to about 3%; and
wherein the propylene glycol is in the range of about 0.1% to about 2%.

26. A solvent-based dye sublimation ink composition specifically for use with ink jet printers, which comprises:
vinyl chloride-vinyl acetate copolymer in the range of about 2% to about 6%;
polymeric amide in the range of about 0% to about 4%;
ethyl acetate in the range of about 0% to about 4%;
2-methoxy-1-methylethyl acetate in the range of about 0% to about 1.25%;
N-butyl acetate in the range of about 0% to about 2.5%;
Butan-2-OL in the range of about 0% to about 0.5%;
distillate in the range of about 0% to about 3%;
at least one sublimable disperse dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
additional acetate in the range of about 78% to about 95%.

27. A solvent-based dye sublimation ink composition as defined by claim 26, wherein the polymeric amide is in the range of about 0.1% to about 4%;
wherein the ethyl acetate is in the range of about 0.1% to about 4%;
wherein the butan-2-OL is in the range of about 0.1% to about 0.5%;
wherein the distillate is in the range of about 0.1% to about 3%; and
wherein the propylene glycol is in the range of about 0.1% to about 2%.

28. A solvent-based dye sublimation ink composition specifically for use with ink jet printers consisting of:

vinyl chloride-vinyl acetate copolymer in the range of about 2% to about 6%;
polymeric amide in the range of about 0% to about 4%;
ethyl acetate in the range of about 0% to about 4%;
2-methoxy-1-methylethyl acetate in the range of about 0% to about 1.25%;
N-butyl acetate in the range of about 0% to about 2.5%;
Butan-2-OL in the range of about 0% to about 0.5%;
distillate in the range of about 0% to about 3%;
at least one sublimable disperse dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
additional acetate in the range of about 78% to about 95%.

29. A solvent-based dye sublimation ink composition as defined by claim 28, wherein the polymeric amide is in the range of about 0.1% to about 4%;
wherein the ethyl acetate is in the range of about 0.1% to about 4%;
wherein the butan-2-OL is in the range of about 0.1% to about 0.5%;
wherein the distillate is in the range of about 0.1% to about 3%; and
wherein the propylene glycol is in the range of about 0.1% to about 2%.

30. A solvent-based dye sublimation ink composition specifically for use with ink jet printers consisting essentially of:
vinyl chloride-vinyl acetate copolymer in the range of about 2% to about 6%;
polymeric amide in the range of about 0% to about 4%;
ethyl acetate in the range of about 0% to about 4%;
2-methoxy-1-methylethyl acetate in the range of about 0% to about 1.25%;
N-butyl acetate in the range of about 0% to about 2.5%;
Butan-2-OL in the range of about 0% to about 0.5%;
distillate in the range of about 0% to about 3%;
at least one sublimable dye in the range of about 0.25% to about 9%, wherein the disperse dye is insoluble in the at least one of an ether and at least one acetate, the solvent-based dye sublimation ink composition being flowable through a head of an ink jet printer;
propylene glycol in the range of about 0% to about 2%; and
additional acetate in the range of about 78% to about 95%.

31. A solvent-based dye sublimation ink composition as defined by claim 30, wherein the polymeric amide is in the range of about 0.1% to about 4%;
wherein the ethyl acetate is in the range of about 0.1% to about 4%;
wherein the butan-2-OL is in the range of about 0.1% to about 0.5%;
wherein the distillate is in the range of about 0.1% to about 3%; and
wherein the propylene glycol is in the range of about 0.1% to about 2%.

\* \* \* \* \*